April 27, 1937.   H. A. ROSE   2,078,685
VAPOR ELECTRIC CONVERTER
Filed Nov. 21, 1935
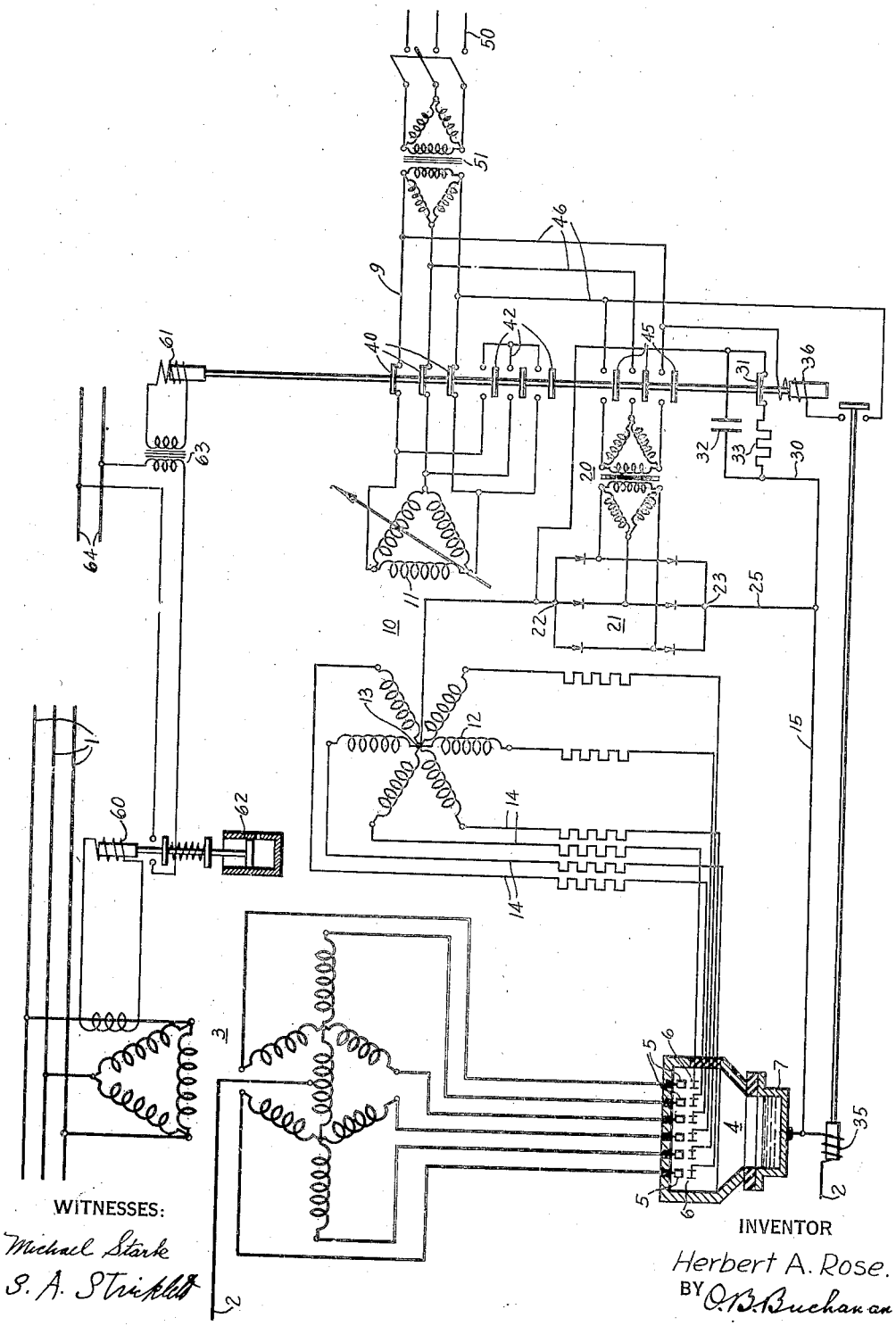
WITNESSES:
Michael Starke
S. A. Stricklett
INVENTOR
Herbert A. Rose.
BY O. B. Buchanan
ATTORNEY Patented Apr. 27, 1937

2,078,685

UNITED STATES PATENT OFFICE 2,078,685

VAPOR ELECTRIC CONVERTER

Herbert A. Rose, Pittsburgh, Pa., assignor to Westinghouse Electric & Manufacturing Company, East Pittsburgh, Pa., a corporation of Pennsylvania Application November 21, 1935, Serial No. 50,896

10 Claims. (Cl. 175—363)

My invention relates to a protective system for a vapor electric converter and particularly to a system responsive to abnormal operating conditions of the converter for applying biasing potential for discontinuing operation of the converter.

In the operation of vapor electric converters, it is desirable to block the arcs to discontinue operation of the converter in order to eliminate disturbances, such as arc-back, short-circuit or overloads on the converter. In grid-controlled converters, it is customary to provide suitable impulsing devices to supply control impulses to the several valves of the converter to determine their operation. In the event it is desired to block the operation of such a grid-controlled converter, it is desirable to be able to supply a sufficiently high negative blocking potential to the several grids of the converter so that all of the valves are simultaneously blocked.

I have found that such a blocking potential may be conveniently applied by inserting the biasing potential between the cathode of the converter and the neutral point of a suitable grid-control transformer.

According to my invention, a suitable blocking potential is provided, preferably from an alternating-current source, which is rectified and connected between the cathode of the converter and the neutral point of the control transformer. In order to prevent blocking of the converter during normal operation a short-circuit connection is provided around the terminals of the biasing source so that the same is ineffective.

Suitable contact means are provided for opening and closing the short-circuit of the biasing potential in response to any predetermined abnormal operation of the converter.

During the interval that the biasing potential source is short-circuited, it is desirable to deenergize this source in order to eliminate losses in and deterioration of the biasing equipment.

When the converter is operating with the grid potentials displaced in phase with respect to the phase of the anode potentials in order to secure reduced output voltage from the converter, the sudden removal of the biasing potential and the application of the control impulses results in a momentary loss of control which is indicated by the output potential of the converter rising to a voltage greater than that normally produced at the setting of the phase control.

I have found that this condition results from transient shock introduced into the control system by the switching operations. To overcome this difficulty my invention provides for a condenser shunted by a resistor and the contacts in the shunt circuit for the biasing potential. When the biasing potential is applied to the grid circuits the capacitor is charged to the full biasing potential. Then when it is desired to release the grids of the converter to permit normal current conduction the contact closes in the shunt circuit to short circuit the capacitor through the resistor which discharges its energy through the resistor exponentially with time so that the biasing potential is in effect gradually removed from the system. This gradually reducing biasing potential superimposed on the impulsing potential retains sufficient biasing voltage on the control grids to prevent undesirable loss of control.

The capacitor as connected also serves to lessen the duty on the switching device in the shunt circuit.

When a control device, such as a transformer, is utilized for applying a biasing potential to the grids of the converter, it is possible that if the biasing potential is applied while one or more of the anodes are carrying current, surges may be set up in the windings of the transformer which may produce positive impulses to one or more of the other control grids, permitting the associated anode to pick up. I have found that this may be eliminated by short-circuiting the primary of the control transformer simultaneously with the application of the biasing potential.

It is an object of my invention to provide a protective system in which a biasing potential is applied to the control grids of the converter in response to a predetermined abnormal condition in the converter or its associated circuits.

It is a further object of my invention to provide a control circuit such that the biasing potential may be rendered inoperative during normal operation of the converter.

It is a further object of my invention to provide means for suppressing surges set up in the control circuits connected to the blocking grids.

It is a further object of my invention to provide means for utilizing the impulsing device for distributing the biasing potential to the several control electrodes.

Further objects and advantages of my invention will be apparent from the following detailed description taken in conjunction with the accompanying drawing, in which the single figure is a schematic illustration of a conversion system embodying my invention.

The illustrated embodiment of my invention comprises an alternating-current circuit 1 and a direct-current 2, the alternating-current circuit and direct-current circuit being interconnected by means of a suitable transformer 3, the flow of current through which is controlled by means of a valve type converter 4. Each of the valves 5 of the converter 4 is provided with control electrodes 6, which control electrodes 6 are supplied with control potential from any suitable source, such as a control transformer 10. This control device 10 has a primary winding 11 connected to any suitable source of control potential and a secondary winding 12 having a plurality of phase windings providing a neutral point 13, and a plurality of phase terminals connected by suitable circuits 14 to the control grids 6, the neutral point 13 of the control transformer 10 being to the cathode 7 of the converter 4 by a circuit 15 of relatively low impedance as compared to the impedance of circuits 14.

Biasing potential for supplying a biasing or blocking potential to the grids 6 is provided by a biasing transformer 20, the secondary terminals of which are connected to a suitable full-wave rectifying device 21, the terminals 22—23 of which are connected in series with the return circuit 15 from the cathode 7 to the neutral point 13 of the device 10.

When potential is applied to the biasing transformer 20, the secondary potential of this transformer 20 is rectified by the rectifying device 21, and the negative terminal 22 being connected to the neutral point 13 of the control transformer 10, the negative potential of the biasing source is distributed by this transformer 10 to all of the control grids 6.

In order to render the biasing transformer 20 inoperative for normal operation of the converter 4, I have provided a shunt circuit 30 around the source of biasing potential, and provided a contactor 31 or other suitable switch device in this shunt circuit 30 so that when the switching device 31 is closed the biasing potential is ineffective to block the operation of the converter 4.

A suitable capacitor 32 is connected in shunt with the switching device 31 in such manner that upon application of the biasing potential the capacitor is charged to the full biasing potential while a suitable ballast resistor 33 is provided in series with the capacitor 32 and switching device 31 in such manner that upon closing of the switching device 31 the capacitor 32 is discharged exponentially with time to gradually decrease the biasing potential and thus restore normal operation of the control system without loss of control in the converter.

The switching device 31 controlling the shunt circuit 30 is controlled by a suitable relay 35 responsive to any predetermined condition in the converter 4. As illustrated, the relay 35 is responsive to overcurrent in the circuit 2, but could be made responsive to overcurrent in the anode circuits or to any other abnormal current or voltage or even temperature condition of the converter 4.

During the application of biasing potential to the grids 6 of the converter 4, it is desirable that the control impulses be discontinued. For this purpose I have provided a suitable switching device 40 in the supply circuit 9 of the control transformer 10 and open this switching device 40 by means of a relay system which may conveniently be the same relay system 35 which controls the shunt circuit 30. Since I use the grid control system, such as the secondary 12 of the control transformer 10, for distributing biasing potential to the control electrodes 6 of the individual valves 5, it is possible that because of current flow through one or more of the valves 5 surges or oscillations might be set up in the windings 12 of the control transformer 10, which surges might be of sufficient value to temporarily unbalance the negative potential applied to one or more of the control grids 6, thus permitting undesirable operation of the valves 5 associated with said grids 6.

In order to eliminate this possibility, I have provided means 42 for short-circuiting the control transformer 10 so that any surges will be effectively damped out. The short-circuiting of the control transformer may be controlled by any suitable relay circuit. As shown, the control contacts 42 for the short-circuiting system are controlled by the same relays 35 as control the shunt circuit 30 of the biasing potential and the supply circuit 9 of the transformer 10.

In order to prevent unnecessary losses in the biasing system while the same is inoperative, I prefer to deenergize the biasing transformer 20 during normal operation of the converter 4. For this purpose I have shown a switching mechanism 45 in the supply circuit 46 of the biasing transformer 20.

While for simplicity of description and illustration I have shown all of these switching mechanisms 31, 40, 42, 45 as operated by a single mechanism 36, it will be apparent that individual relay circuits may be used for each of the switching devices.

When my control system is utilized with a converter 4, particularly a converter of the high-voltage type, it is desirable to insulate the control circuits 9 and 46, which are necessarily at the potential of the converter 4 from any supply circuit 50. For this reason I have shown a suitable insulating transformer 51 inserted in the supply circuit 50. However, such insulating transformer 51 in nowise affects the operation of the control devices, but merely protects the supply circuit 50 or any one working thereon from the potential of the device 4.

For certain faults such as arc-backs, the current in relay 35 may not be of suitable value to produce a closing operation in the actuating circuit for circuit breakers 31, 40 and 42. Therefore I provide an auxiliary relay 60 responsive to over current in the alternating current circuit for actuating a second operating coil 61 for the breakers 31, 42 and 45. In the event of a fault such as indicated by operation of relay 60 it may be desirable to delay restarting of the arc in the converter and for this purpose relay 60 is provided with a time delay mechanism illustrated as a dashpot 62 which operates to maintain blocking potential on the electrodes 6 for a predetermined time interval after the clearing of the fault in the converter 4.

As relay 60 is associated with the potential of the alternating current line while operating coil 61 is associated with the potential of the converter, it is frequently desirable to provide an insulating transformer 63 between the control circuit 64 and operating coil 61.

In the operation of my device the supply circuit 9 to the control transformer 10 is normally closed so that the control transformer 10 supplies successive control impulses to the individual control grids 6 of the converter 4. Upon the occasion of an abnormal operating condition, the relay circuit 55, responsive to this condition is operated so that the switching devices open the short-circuit of the biasing source, energize the biasing transformer, deenergize the control transformer, and short-circuit the same so that the normal control impulses are interrupted. Biasing potential is applied to all of the grids of the converter until such time as the abnormal condition has been eliminated, after which the relay circuit will be deenergized and restore the control system to normal.

If desired, a suitable time delay mechanism may be inserted in the relay circuit to insure a suitable time interval before reapplying the control impulses after the occurrence of an abnormal operating condition in the converter.

While for purposes of illustration I have shown and described a specific embodiment of my invention, it will be apparent that changes and modifications can be made therein without departing from the true spirit of my invention or the scope of the appended claims.

I claim as my invention:

1. A protective system for a vapor-electric converter having a plurality of grid-controlled valves comprising a control grid for each valve of the converter, an impulsing device for producing control impulses for said grids, connections from said device to said grids for impressing said control impulses thereon, a circuit for supplying energy to said impulsing device, a return circuit from the cathode of said converter to said impulsing device, a biasing transformer, a circuit for energizing said biasing transformer, a rectifying device connected to said biasing transformer for producing a unidirectional biasing potential, said rectifying device having positive and negative terminals connected to said return circuit whereby a portion of said return circuit comprises a shunt around said rectifying device and contact means for opening and closing said shunt for controlling the application of the biasing potential to the grids.

2. A protective system for a vapor-electric converter having a plurality of grid-controlled valves comprising a control grid for each valve of the converter, an impulsing device for producing control impulses for said grids, connections from said device to said grids for impressing said control impulses thereon, a circuit for supplying energy to said impulsing device, a return circuit from the cathode of said converter to said impulsing device, a biasing transformer, a circuit for energizing said biasing transformer, a rectifying device connected to said biasing transformer for producing a unidirectional biasing potential, said rectifying device having positive and negative terminals connected to said return circuit whereby a portion of said return circuit comprises a shunt around said rectifying device and contact means for opening and closing said shunt for controlling the application of the biasing potential to the grids, and means responsive to the current condition in said converter for determining the position of said contact means.

3. A protective system for a vapor-electric device, comprising a control electrode in the arc path of said device, a source of biasing potential, a rectifying device energized from said source, a connection from said rectifying device to said control electrode, a connection from a cathode of the vapor-electric device to the rectifying device, a circuit connected in shunt with said rectifying device, a contact for opening and closing said shunt circuit, said shunt circuit being normally closed to render said rectifying device ineffective and a relay responsive to abnormal current conditions in said vapor-electric device for opening said short circuit for applying the potential of the rectifying device to the control electrode.

4. A protective system for a vapor-electric device, comprising a control electrode in the arc path of said device, a source of biasing potential, a device energized from said source for producing unidirectional biasing voltage, a connection from said device to said control electrode, a connection from a cathode of the vapor-electric device to the device, a circuit connected in shunt with said device, means for opening and closing said shunt circuit, said shunt circuit being normally closed to render said device ineffective and a relay responsive to abnormal current conditions in said vapor-electric device for opening said short circuit for applying the potential of the device to the control electrode, and means connected to said shunt circuit for suppressing surges upon closing said shunt circuit.

5. A protective system for a multi-valve converter comprising a control electrode for each valve of the converter, means for impressing control potentials on said electrodes for permitting current conduction by said valves, a source of unidirectional biasing potential, means for impressing said biasing potential on said control electrodes, a shunt connection around said source of biasing potential, control means for said shunt connection, said control means normally maintaining said shunt connection closed for rendering said biasing potential ineffective, said control means being responsive to abnormal conditions in said converter for opening said shunt connection.

6. A protective system for a vapor-electric device having a plurality of valves, comprising a control electrode for each of said valves, an impulsing transformer having an impulsing and an exciting winding, a mid-tap in said impulsing winding and a plurality of phase terminals, connections from said terminals to said control electrodes, a connection from said mid-tap to the cathode of said valves, a circuit breaker for controlling said connection, a supply circuit connected to said exciting winding, a circuit breaker for opening and closing said circuit, a short circuiting connection for said exciting winding, a circuit breaker for controlling said short circuiting winding, a biasing transformer, a supply circuit for said biasing transformer, a circuit breaker in said circuit, a rectifying device for converting the output potential of said transformer to unidirectional current, said rectifying device being connected to the mid-point of said impulsing winding and to the cathode of said vapor-electric device, a relay responsive to abnormal current condition in the valves of said vapor-electric device for opening the supply circuit to said impulsing transformer, closing the supply circuit to the biasing transformer, closing the short circuiting connection for said exciting winding and opening the circuit between the cathode of the vapor-electric device and the mid-tap of the impulsing winding.

7. A protective system for a vapor-electric device, comprising a control electrode in the arc path of said device, a source of biasing potential, a device energized from said source for producing unidirectional biasing voltage, a connection from said device to said control electrode, a connection from a cathode of the vapor-electric device to the device, a circuit connected in shunt with said device, means for opening and closing said shunt circuit, said shunt circuit being normally closed to render said device ineffective and a relay responsive to abnormal current conditions in said vapor-electric device for opening said short circuit for applying the potential of the device to the control electrode, and means connected to said shunt circuit for gradually removing said biasing potential upon closing said shunt circuit.

8. In combination with a controlled vapor electric device having a control electrode, an impulsing device having an impulsing winding, circuit means for impressing the impulses generated in said device on said control electrode, a biasing device for impressing a biasing potential between a cathode of said vapor-electric device and the impulsing device, a control device responsive to abnormal operating conditions for energizing said biasing device, said control device being operative to deenergize said biasing device upon termination of the abnormal operating conditions, a second control device responsive to abnormal operating conditions for energizing said biasing device, and means associated with said second control device for imposing a time delay between the termination of the abnormal operating conditions and the deenergization of the biasing device.

9. In combination with a controlled vapor electric device having a control electrode, an impulsing device having an impulsing winding, circuit means for impressing the impulses generated in said device on said control electrode, a biasing device for impressing a biasing potential between a cathode of said vapor-electric device and the impulsing device, a control device responsive to abnormal operating conditions for energizing said biasing device and deenergizing said impulsing device, said control device being operative to reenergize said impulsing device and deenergize said biasing device upon termination of the abnormal operating conditions, a second control device responsive to abnormal operating conditions for energizing said biasing device and deenergizing said impulsing device and means associated with said second control device for imposing a time delay between the termination of the abnormal operating conditions and the deenergization of the biasing device and reenergization of the impulsing device.

10. In combination, a vapor-electric device having a controlled electrode, a cathode cooperating with said controlled electrode, a control electrode for said controlled electrode, winding means for providing control impulses for said control electrode, circuits for applying the control impulses of said winding means to said control electrode, means for applying biasing potential between a cathode of said vapor-electric device and the windings of said impulsing means, a control device responsive to abnormal operating conditions for energizing said biasing means and deenergizing said impulsing means, means cooperating with said control means for changing the impedance of said impulsing means, and means for automatically releasing said biasing potential and reapplying said control impulses after a predetermined time delay following termination of the abnormal operating conditions.

HERBERT A. ROSE.